United States Patent [19]

Carlson et al.

[11] 4,096,711
[45] Jun. 27, 1978

[54] DUAL FLEX PLATE DRIVE

[75] Inventors: George A. Carlson; William O. Jankovsky, both of Peoria, Ill.

[73] Assignee: Caterpillar Tractor Co., Peoria, Ill.

[21] Appl. No.: 750,091

[22] Filed: Dec. 13, 1976

[51] Int. Cl.² ............................................. F16D 3/78
[52] U.S. Cl. ...................................... 64/13; 64/15 B; 64/11 F
[58] Field of Search ........................... 64/13, 15, 11 F

[56] References Cited

U.S. PATENT DOCUMENTS

| 2,182,711 | 12/1939 | Thomas | 64/13 |
| 2,846,857 | 8/1958 | Hagenlocher | 64/13 |
| 3,166,165 | 1/1965 | Anderson | 192/3.58 |
| 3,500,658 | 3/1970 | Goody | 64/13 |
| 3,988,907 | 11/1976 | Bohm | 64/13 |

FOREIGN PATENT DOCUMENTS 1,325,013  3/1963  France ........................ 64/15

Primary Examiner—Benjamin W. Wyche
Assistant Examiner—R. C. Turner
Attorney, Agent, or Firm—Wegner, Stellman, McCord, Wiles & Wood

[57] ABSTRACT

A dual flexible drive is pprovided between a torque converter and a transmission to compensate for parallel misalignment therebetween. The flexible drive includes a coupling having a drive tube with enlarged flanges and with laminated flexible plates secured to said flanges and to the output of the torque converter and to the input of the transmission. Pilot guides are provided between the inner and outer periphery of the flexible plates.

4 Claims, 2 Drawing Figures

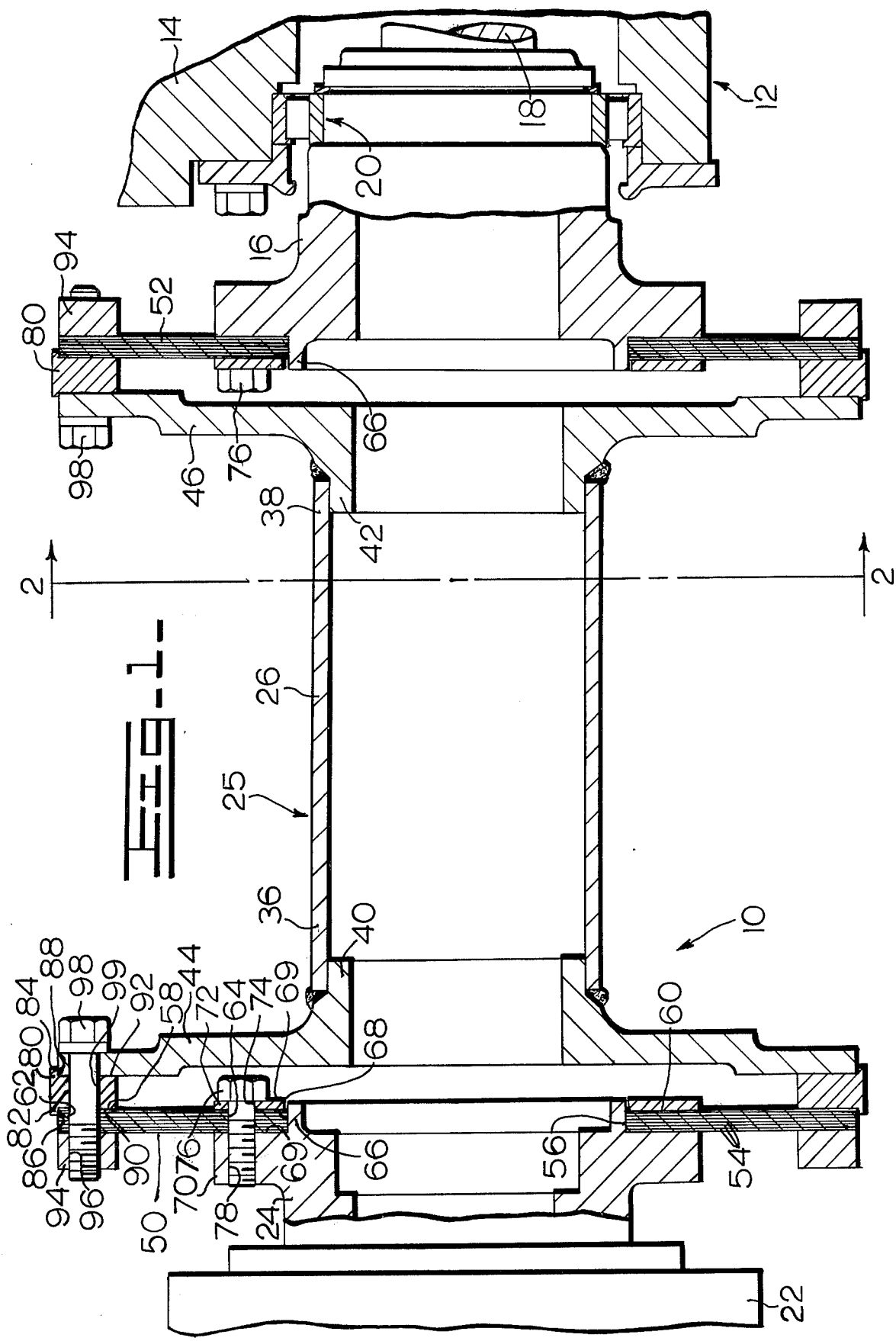

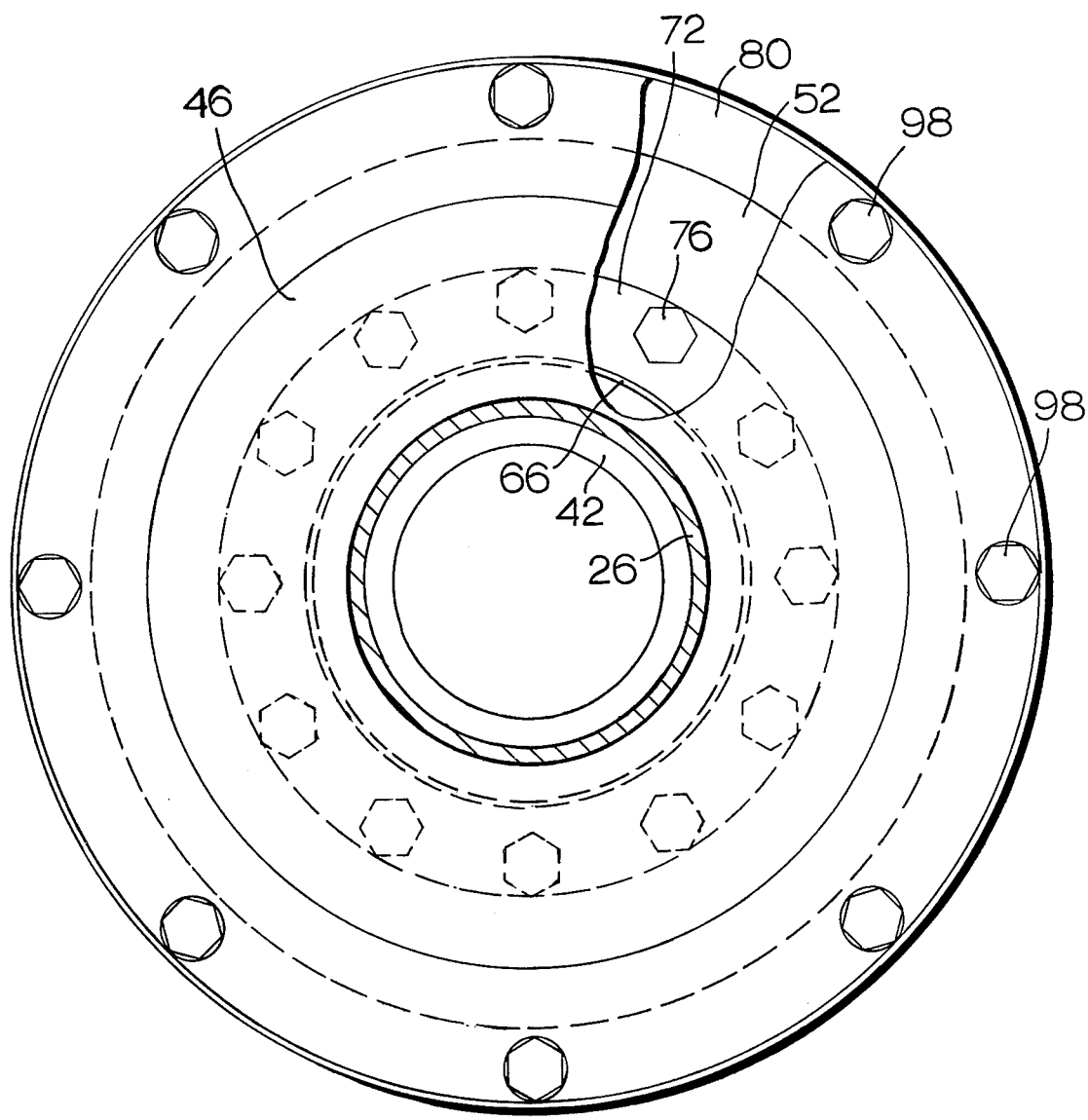

DUAL FLEX PLATE DRIVE

BACKGROUND OF THE INVENTION

1. Field of the Invention

This invention relates to vehicle drive assemblies and more particularly to flexible drive assemblies for accommodating non-parallel shafts of said vehicle drive assemblies.

2. Description of the Prior Art

The problems created by shafts that are misaligned axially and/or angularly is acute in any vehicle but it is of particular concern in heavy-duty vehicles, such as tractors, bulldozers, and the like. That is, the heavy duty vehicle usually is transmitting large forces from the engine to the transmission which forces can become quite destructive if they are not transmitted through aligned shafts or shafts having appropriate accommodations for misalignment. The most commonly used form of accommodation is a universal joint assembly connected between the torque converter on the engine and the transmission. Universal joints require considerable axial space, require lubrication and maintenance and are relatively costly.

SUMMARY OF THE INVENTION

The present invention is directed to overcoming one or more of the problems as set forth above.

According to the present invention, a flexible drive assembly is provided for a vehicle and includes a coupling having a pair of axially spaced flexible plates connected at their outer peripheries to flanges on a drive tube and at their inner peripheries to the output of a power source, such as a torque converter or the like, and to the input to a driven member, such as a transmission or the like. The flexible plates consist of a plurality of discs of a resilient material, such as stainless steel or the like, which discs are laminated together to form said plates. Pilot guides are provided to position the flexible plates in the drive assembly.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view, partially broken away and shown in cross section, of our improved flexible drive assembly; and FIG. 2 is a front cross-sectional view of one of the flexible plates in position in the drive and taken along the line 2—2 of FIG. 1.

DESCRIPTION OF THE PREFERRED EMBODIMENT

Referring to the drawings, the structure shown therein comprises a flexible drive assembly 10 in operative position in the drive line of a vehicle and, in particular, shows a torque converter 12 having a housing 14 surrounding the output yoke 16 of said torque converter 12. The output yoke 16 is connected to the output shaft 18 of the torque converter 12 and is rotatably seated in bearings 20 carried by said housing 14. A transmission 22 is spaced from said torque converter 12 and has an input yoke 24 extending axially therefrom and rotatably mounted therein. A flexible coupling 25 is positioned between the output yoke 16 of the torque converter 12 and the input yoke 24 of the transmission 22.

More specifically, the flexible coupling 25 comprises a drive tube 26 which is connected at each end portion 36 and 38 with axially extending hubs 40 and 42 of radially enlarged flanges 44 and 46. The drive tube 26 and flanges 44, 46 could be a one-piece member without departing from the spirit of the invention. Two flexible drive plates 50 and 52, which are identical in construction, are connected to the opposite ends of the drive tube 26 and respectively to the output yoke 16 of the torque converter 12 and the input yoke 24 of the transmission 22. Since the design, construction and installation of the flexible drive plates 50 and 52 are identical, only one will be described in detail, it being understood that substantially the same description applies to both flexible drive plates 50 and 52.

Flexible drive plate 50 is comprised of a plurality of flat discs 54, each one of which has an opening 56 at the center thereof and is made of strong resilient material, such as spring steel, stainless steel, or the like. A plurality of discs 54 are stacked together and laminated into the flexible drive plate 50 which has, at the outer circumference thereof, oppositely facing outer peripheral portions 58 and had, at the opening 56, oppositely facing inner peripheral portions 60. The drive plate 50 has a plurality of evenly spaced apertures 62 formed transversely through said outer peripheral portions 58 with an increased number of equally spaced apertures 64 formed transversely through said inner peripheral portion 60. The input yoke 24 of the transmission 22 has a pilot member 66 projecting axially outward from and forming a cylindrical shoulder 68 with the planar face 69 of the enlarged hub 70 of said yoke 24. The outer diameter of the pilot 66 substantially equals the interior diameter of the opening 56 in the flexible drive plate 50. The flexible drive plate 50 is assembled over the pilot 66 and bears on the shoulder 68 and against the face 69 on the yoke 24. A backing washer 72 is positioned against the inner peripheral portion 60 of said drive plate 50 and has a plurality of equally spaced apertures 74 aligned with the apertures 64 in said inner peripheral portion 60. A plurality of bolts 76 are passed through the aligned apertures 74, 64 and are threaded into the apertures 78 formed in the hub 70 of the yoke 24. The bolts 76 are threaded into the hub 70 of the input yoke 24 to firmly secure the flexible drive plate 50 to said input yoke 24. A cylindrical spacer ring 80 is provided and has oppositely projecting axially disposed pilot guides 82, 84 formed around the outer edge of said ring 80 with the pilot guides 82, 84 forming internal shoulders 86, 88, respectively, with the planar faces 90, 92 of said spacer ring 80. The one axial pilot 84 fits over the outer edge of the flange 44 with the opposite pilot 82 fitting over the edge of the drive plate 50. The face 90 of the ring 80 seats against the outer peripheral portion 58 of the drive plate 50. A backing ring 94 is positioned against the opposite side of the outer peripheral portion 58 of the drive plate 50 and has threaded apertures 96 aligned with the apertures 62 in said plate 50. Bolts 98 pass through apertures 99 in said spacer ring 80 and on through the apertures 62 in the plate 50 and are threaded into the apertures 96 in said backing ring 94. The bolts 98 are drawn up tight to securely lock the flange 44 of the drive tube 26 to the flexible drive plate 50.

The flexible drive plate 52 is made the same way as flexible drive plate 50 and has its inner peripheral portion seated on the pilot formed on the hub of the output yoke 16 of the torque converter 12 and is bolted thereto by the bolts passing through the ring, through the flexible drive plate and into the yoke 16. The outer periphery of the flexible drive plate 52 is secured to the flange 46 and is spaced therefrom by the continuous spacer ring 80 having the pilot guides 82, 84 on opposite sides thereof bearing against the peripheral portion of the drive plate 52 and the periphery of the flange 46. Bolts 98 pass through the flange 44, the spacer ring 80, the outer peripheral portion of the flexible drive plate 52 and the backing ring 94 and are tightened to provide a secure connection between the drive tube 26 and the output yoke 16 of the transmission 22.

Forces on the shaft 18 of the torque converter 12 are transmitted through the output yoke 16 to the flexible drive plate 52 and through the spacer ring 80 and flange 46 of the drive tube 26 to the flange 44, spacer ring 80 and flexible drive plate 52, which in turn transmits the forces to the input yoke 24 of the transmission 22. The flexible drive plates 50, 52 are such that they will permit a limited amount of non-parallelism or angular or axial misalignment between the shaft 18 of the torque converter 12 and the centerline of the input yoke 24 of the transmission 22. The flexible drive plates 50, 52 will distort sufficient to transmit the loads without the usual destructive forces that would normally be set loose with misaligned input and output shafts. The flexible drive plates 50, 52 also serve to absorb a limited amount of shock loads that might otherwise be transmitted from the torque converter 12 to the transmission 22. The flexible coupling 25 does not require lubrication and only requires a minimum of maintenance. The axial length of the drive tube arrangement 26 and flanges 44, 46 is relatively minimal especially compared to currently existent universal joints or currently existing flexible couplings for use in heavy duty drive lines. The cost of installing the dual flexible tube assembly is minimal compared to the cost of universal joints, and the life expentancy of the dual flexible drive plate assembly exceeds by several multiples the life expectancy of conventional universal joints, and the like.

The embodiments of the invention in which an exclusive property or privilege is claimed are defined as follows:

1. In a vehicle drive assembly, in combination,
   (a) a power source having an output,
   (b) a transmission axially spaced from said power source and having an input,
   (c) a coupling axially aligned with and positioned between said power source and said transmission,
   (d) said coupling having means connecting said coupling to said power source and to said transmission,
   (e) said means comprising two flexible plates,
   (f) each said flexible plate being secured along its outer peripheral portion to flanges on said coupling,
   (g) one of said flexible plates being secured along its inner peripheral portion to the output of the power source,
   (h) the other of said flexible plates being secured along its inner peripheral portion to the input of the transmission,
   (i) a spacer ring secured between each flexible plate and said coupling, and
   (j) oppositely extending pilots formed on each said ring with one pilot engaging the coupling and the other pilot engaging one of said flexible plates, said pilots positioning said flexible plates and said coupling relative to each other.

2. A vehicle drive assembly having,
   (a) a torque converter with an output yoke,
   (b) a transmission axially spaced from said torque converter and having an input yoke,
   (c) a coupling axially aligned with and positioned between said torque converter and said transmission,
   (d) said coupling having a drive tube and flexible means connecting said drive tube to said torque converter and to said transmission,
   (e) said flexible means comprising plural discs of resilient material laminated together to form flexible plates,
   (f) each said flexible plate being secured along its outer peripheral portion to said drive tube,
   (g) one of said flexible plates being secured along its inner peripheral portion to the output yoke of the torque converter,
   (h) the other of said flexible plates being secured along its inner peripheral portion to the input yoke of the transmission, and
   (i) a spacer ring positioned between each said flexible plate and said drive tube, each said spacer ring having axially and oppositely extending pilots, one pilot engaging said spacer ring and the other pilot engaging said drive tube for positioning said flexible plates and said drive tube relative to each other.

3. A vehicle drive assembly as claimed in claim 2 wherein a third pilot is provided on both the input yoke and the output yoke, said flexible plates seating on said third pilots for positioning said plates relative to said input and output yokes.

4. A vehicle drive assembly as claimed in claim 1 wherein a third pilot is provided on both the input yoke and the output yoke, said flexible plates seating on said third pilots for positioning said plates relative to said input and output yokes.

* * * * *

UNITED STATES PATENT AND TRADEMARK OFFICE
CERTIFICATE OF CORRECTION

PATENT NO. : 4,096,711

DATED : June 27, 1978

INVENTOR(S) : George A. Carlson and William O. Jankovsky

It is certified that error appears in the above-identified patent and that said Letters Patent are hereby corrected as shown below:

ABSTRACT, line 1, change "pprovided" to --provided--.

Column 4, line 41, delete "spacer ring" and insert therefor --flexible plate--.

Signed and Sealed this

Fourth Day of March 1980

[SEAL]

Attest:

SIDNEY A. DIAMOND

Attesting Officer     Commissioner of Patents and Trademarks